United States Patent
Jeffrey et al.

(10) Patent No.: US 7,034,887 B2
(45) Date of Patent: Apr. 25, 2006

(54) METHOD AND APPARATUS FOR FLICKER FILTERING INTERLACED DISPLAY DATA

(75) Inventors: Eric Jeffrey, Richmond (CA); Barinder Rai, Surrey (CA)

(73) Assignee: Seiko Epson Corporation, Tokyo (JP)

( * ) Notice: Subject to any disclaimer, the term of this patent is extended or adjusted under 35 U.S.C. 154(b) by 659 days.

(21) Appl. No.: 10/197,512

(22) Filed: Jul. 15, 2002

(65) Prior Publication Data
US 2004/0008281 A1 Jan. 15, 2004

(51) Int. Cl.
*H04N 5/21* (2006.01)
*H04N 5/213* (2006.01)

(52) U.S. Cl. .............. 348/447; 348/910; 348/607; 348/446; 348/448; 345/531

(58) Field of Classification Search .......... 348/607, 348/910, 447, 446, 448, 441, 445, 615, 715; 345/530, 531, 545; 382/260, 263, 264, 275
See application file for complete search history.

(56) References Cited

U.S. PATENT DOCUMENTS

| | | | | |
|---|---|---|---|---|
| 5,182,643 A | * | 1/1993 | Futscher | 348/447 |
| 5,455,628 A | * | 10/1995 | Bishop | 348/446 |
| 5,561,777 A | | 10/1996 | Kao et al. | |
| 5,818,433 A | | 10/1998 | Sherburne | |
| 5,914,753 A | * | 6/1999 | Donovan | 348/441 |
| 5,990,965 A | * | 11/1999 | Herz et al. | 348/446 |
| 6,061,094 A | * | 5/2000 | Maietta | 348/446 |
| 6,072,530 A | | 6/2000 | Bril | |
| 6,081,303 A | | 6/2000 | Kim | |
| 6,084,568 A | * | 7/2000 | Premi et al. | 345/603 |
| 6,219,101 B1 | * | 4/2001 | Sani et al. | 348/447 |
| 6,272,497 B1 | | 8/2001 | Mendenhall et al. | |
| 6,281,933 B1 | | 8/2001 | Ritter | |
| 6,320,619 B1 | * | 11/2001 | Jiang | 348/447 |
| 6,563,544 B1 | * | 5/2003 | Vasquez | 348/447 |
| 6,839,093 B1 | * | 1/2005 | Gryskiewicz | 348/555 |

* cited by examiner

*Primary Examiner*—John Miller
*Assistant Examiner*—Jean W. Désir

(57) ABSTRACT

A graphics controller for flicker filtering interlaced image data is provided. The graphics controller includes a buffer and a memory region. A flicker filter for reducing a flicker of a display presented through an interlaced scan is also provided. The flicker filter is configured to receive interlaced image data prior to any received image data being stored in the memory region. The flicker filter outputs filtered data defining a pixel. The filtered data is stored in the memory region such that two pixels can be output in one memory access to the memory region. Flicker filter enabling circuitry in communication with the buffer is provided. The flicker filter enabling circuitry is configured to supply an even segment and a corresponding odd segment of the interlaced image data to the flicker filter. An apparatus and methods for processing and storing image data having an interlaced format are also provided.

25 Claims, 9 Drawing Sheets

Even Field Lines

Odd Field Lines

Even Field Lines

Odd Field Lines

Even Field Lines

Odd Field Lines

METHOD AND APPARATUS FOR FLICKER FILTERING INTERLACED DISPLAY DATA

BACKGROUND OF THE INVENTION

1. Field of the Invention

This invention relates generally to image display systems and more particularly to a method and apparatus for flicker filtering image data for presentation on a display screen through interlaced scanning.

2. Description of the Related Art

Images presented on the display screen of a television through interlaced scanning are presented in a manner that ensures that the image has an even brightness throughout instead of having separate bright and dark bands. With interlaced scanning, each still picture is made up of two scans consisting of alternate lines. For example, the even numbered lines of one field are scanned and then the odd numbered lines of a second field are scanned. A complete pass through all the even and odd numbered lines make-up one frame of data.

Sharp transitions in color between adjacent scan lines result in flicker when presented on a television screen. That is, flicker is caused on a National Television System Committee (NTSC) monitor screen when a pixel or horizontal group of pixels of a higher intensity are bordered on the top or bottom by lower intensity pixels. The flicker causes a strain on human eyes as well as deterring from the quality of the display. As bandwidth is a concern with television, interlaced scanning has been adopted to allow the frame repetition rate to be reduced by one half. As mentioned above, an interlaced scan is made up of a frame of data that is divided into an even field and an odd field, wherein a single vertical scan covers half the lines, i.e., the even field or the odd field. Thus, each frame takes two vertical scans with even and odd lines scanned on alternate fields.

FIG. 1 is a schematic diagram of a process for filtering interlaced image data to reduce flicker. Memory 100 contains image data stored as even and odd lines. Even data is placed into even pipe 102 through one memory access, while odd data is placed into odd pipe 104 through a second memory access. Corresponding even and odd data is then filtered through flicker filter 106. Flicker filter 106 averages the corresponding even and odd data to reduce flickering between adjacent lines presented on display screen 110. Where display screen 110 is a television screen, the display screen will typically have 525 lines with half of the lines in an even field and the other half in an odd field. Depending on the flicker filter algorithm employed, incoming data can be written to memory 100 twice.

Furthermore, the lines of distinction between computers and televisions are blurring, since computers are taking on characteristics of televisions and televisions are taking on characteristics of computers. However, the displays for a television are presented through interlaced scanning while computers use progressive scanning techniques. Interlaced scanning techniques are well suited for television displays because they are less demanding on the memory of a television, which is limited relative to a computer's memory resources. Moreover, as television systems further enhance the functionality available to the viewer and as television manufacturers simultaneously embrace high definition television standards, the demands on memory will further rise. In turn, costs are incurred in supporting these demands, such as increased memory capacity to avoid image corruption. Additionally, the increased memory capacity corresponds to greater power consumption.

As a result, there is a need to solve the problems of the prior art to provide a method for reducing the demands on memory and corresponding power required by the memory while maintaining the quality of a display of image data generated through interlaced scanning.

SUMMARY OF THE INVENTION

Broadly speaking, the present invention fills these needs by providing a method and system for flicker filtering the image data prior to storage in memory. It should be appreciated that the present invention can be implemented in numerous ways, including as a process, a system, or a device. Several inventive embodiments of the present invention are described below.

In one embodiment a graphics controller is provided. The graphics controller includes a buffer and a memory region. A flicker filter for reducing a flicker of a display presented through an interlaced scan is also provided. The flicker filter is configured to receive interlaced image data prior to any received image data being stored in the memory region. The flicker filter outputs filtered data defining a pixel. The filtered data is stored in the memory region such that two pixels can be output in one memory access to the memory region. Flicker filter enabling circuitry in communication with the buffer is provided. The flicker filter enabling circuitry is configured to supply an even segment and a corresponding odd segment of the interlaced image data to the flicker filter.

In another embodiment, an apparatus for displaying an interlaced image on a display screen is provided. The apparatus includes a central processing unit (CPU). A graphics controller configured to receive interlaced image data is provided. The graphics controller includes a flicker filter configured to combine even line data and odd line data to reduce flicker. The even line data and the odd line data are provided directly to the flicker filter without storing the even line data and the odd line data in a memory associated with the graphics controller. The flicker filter is configured to output the combined even and odd line data to a memory of the graphics controller. A bus in communication with the CPU and the graphics controller and a display screen for presenting the combined even and odd line data in the memory associated with the graphics controller are also provided.

In yet another embodiment, a method for storing image data to be presented through interlaced scanning is provided. The method initiates with using a graphics controller configured to process interlaced image data. Then, the interlaced image data is supplied to a flicker filter of the graphics controller without copying the interlaced image data to a memory associated with the graphics controller. Next, the interlaced image data is filtered to reduce a flicker. Then, the filtered image data is stored in the memory associated with the graphics controller.

In still yet another embodiment, a method for processing image data having an interlaced format is provided. The method initiates with using a graphics controller configured to process interlaced image data. Then, a first line of the interlaced image data is received by a line buffer of the graphics controller. Next, a second line of the interlaced image data is received by the graphics controller. Then, segments of the first line of the interlaced image data and corresponding segments of the second line of the interlaced image data are supplied to a flicker filter of the graphics controller. Next, the segments of the first line are written to a memory associated with the graphics controller. Then, the segments of the first line and the corresponding segments of the second line are filtered to reduce a flicker prior to writing any further image data to a memory of the graphics controller. Next, the filtered data is stored in memory such that the stored filtered data is configured to output at least two pixels of data in a single memory read.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

Figure 1:
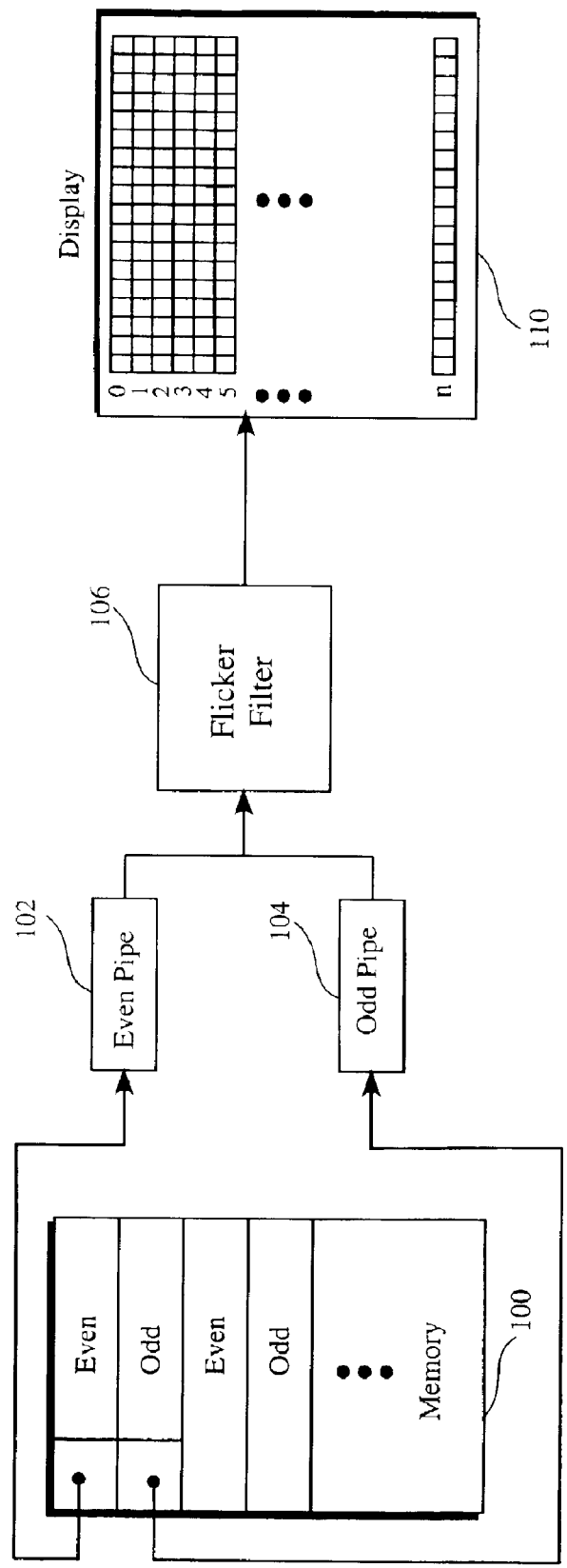
FIG. 1 is a schematic diagram of a process for filtering interlaced image data to reduce a flicker.

An invention is described for an apparatus and method for reducing the demands on memory for a system configured to display an image through interlaced scanning. It will be obvious, however, to one skilled in the art, that the present invention may be practiced without some or all of these specific details. In other instances, well known process operations have not been described in detail in order not to unnecessarily obscure the present invention. FIG. 1 is described in the "Background of the Invention" section.

The embodiments of the present invention provide a method and apparatus for reducing the amount of image data stored by a system presenting an interlaced scan, such as a television. Video image data is supplied to a television in interlaced format. In order to reduce flicker associated with the interlaced format, the image data is processed through a flicker filter of a graphics controller. The received image data is processed through flicker filter enabling circuitry so that the data can be sent directly to a flicker filter of the graphics controller. That is, the received image data is not stored in an onboard memory of the graphics controller before the received image data is processed by the flicker filter.

The flicker filter then processes the image data to reduce a flicker. In one embodiment, the flicker filter averages adjacent even line data and odd line data to reduce flicker associated with interlaced scanning techniques. The flicker filtered data is then stored in memory of the graphics controller, such as a random access memory (RAM). Since the flicker filtering is performed prior to storing the data in memory, data is not stored twice in the memory when the data is stored as alternating pairs in memory. Consequently, the amount of memory required to store image data is reduced by about 50% for a controller configured to flicker filter image data directly without storing the received image data. It should be appreciated that since memory fetches are likewise reduced as the image data is sent directly to the flicker filter, i.e., it is not necessary for a display pipe for the flicker filter to fetch the even line data and the odd line data from memory, the amount of power consumed is similarly reduced. It should be appreciated that the demands on memory are likewise reduced since the fetches, i.e., memory accesses, are reduced.

Figure 2:
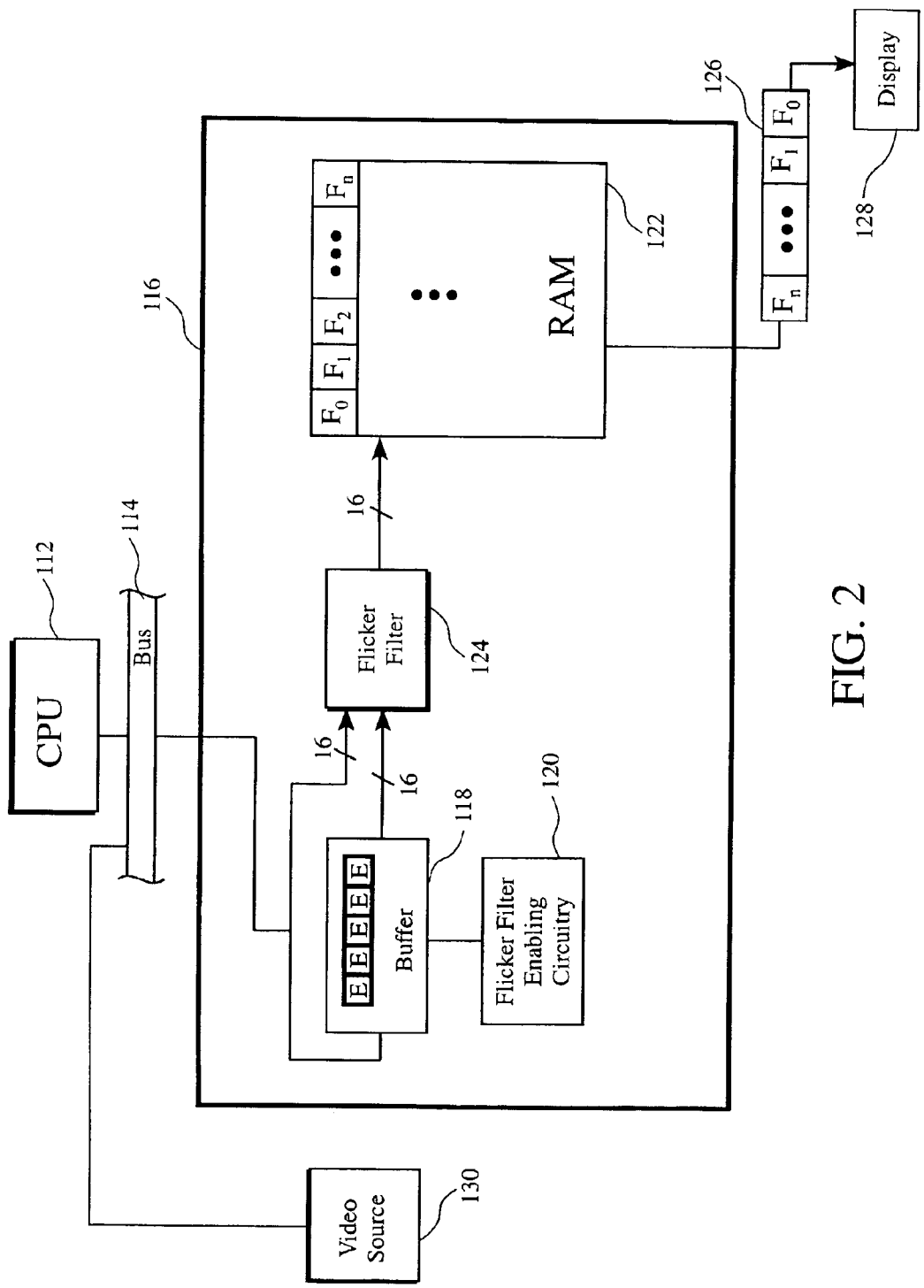
FIG. 2 is a schematic diagram of a graphics controller configured to process data directly through a flicker filter before storing the data to be presented through an interlaced scan in accordance with one embodiment of the invention.

FIG. 2 is a schematic diagram of a graphics controller configured to process data directly through a flicker filter before storing the data to be presented through an interlaced scan in accordance with one embodiment of the invention. Central processing unit (CPU) 112 is in communication with graphics controller 116 through bus 114. Video source 130 supplies video image data to be processed by graphics controller 116 and presented on display 128. In one embodiment, video image data is supplied from an external source to graphics controller 116 as directed by CPU 112. In another embodiment, video image data is supplied directly to graphics controller 116 from a live feed, such as a cable television or satellite source. Graphics controller 116 includes one line buffer 118 in communication with flicker filter 124. Flicker filter enabling circuitry 120 is in communication with buffer 118. Flicker filter enabling circuitry 120 is configured to process the video data to enable filtering of the video data through flicker filter 124 without storing the data in RAM 122, as will be explained in more detail below.

In one embodiment, 16 bit even line and odd line segments are sent to flicker filter 124 for processing to reduce a flicker. Of course, the method described herein can work for any color depth and is not limited to a color depth of 16 bits per pixel. The even segment corresponds to an even line, while the odd segment corresponds to an odd line of an interlaced image. It should be appreciated that each even and odd segment pair corresponds to an adjacent even and odd line, respectively. Thus, each even and odd segment pair define a pixel of data. As is well known, flicker filter 124 is configured to reduce a flicker on a display of an interlaced scan by averaging data from adjacent lines to smooth a contrast between displayed lines. The filtered data output from flicker filter 124 is output to display 128 through display pipe 126. In one embodiment, display 128 is a television screen, however, display 128 can be any suitable display for an interlaced image format.

Still referring to FIG. 2, one skilled in the art will appreciate that CPU 112 can be a digital signal processor (DSP) containing code for directing video data from video source 130 to graphics controller 116 over bus 114. Additionally, CPU 112 can be a component of an embedded system. In one embodiment, line buffer 118 is sized to hold one line of even or odd data. Buffer 118 includes suitable storage circuitry such as latches, flip flops, etc., to temporarily hold incoming video image data and eventually transfer the data to flicker filter 124. Flicker filter enabling circuitry 120 includes circuitry, i.e., logic gates, counters, comparators, and registers for shifting the video data through buffer 118, and enabling the transfer of the appropriate even and odd segments to flicker filter 124. In one embodiment, buffer 118 is a shift register consisting of a number of clocked latches or flip flops suitable to hold one line of incoming video data from video source 130. It should be appreciated that incoming video data from video source 130 will be received in an interlaced form. That is, the incoming video data will be transmitted in adjacent even and odd lines.

Figure 3:
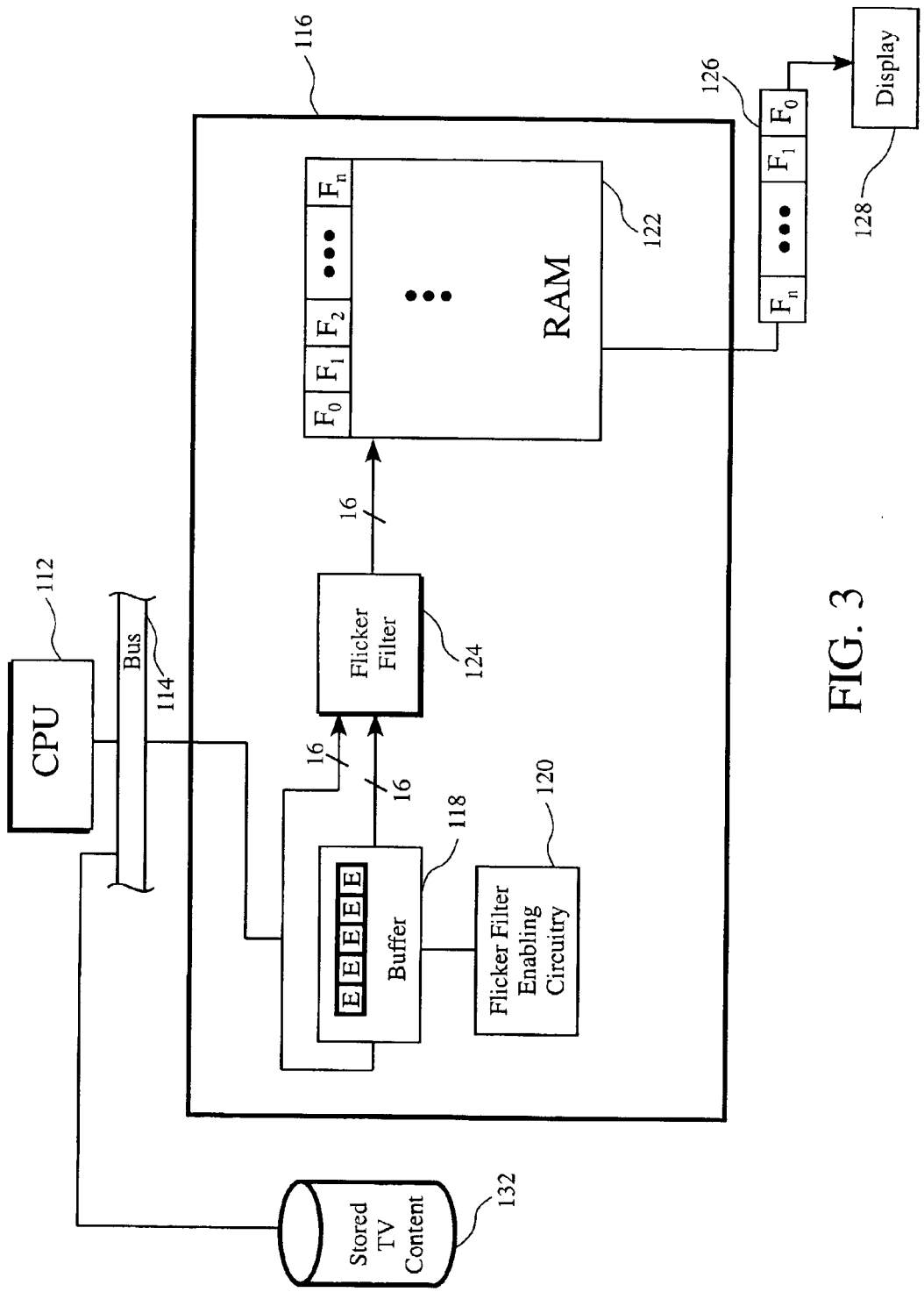
FIG. 3 is a schematic diagram of a graphics controller of FIG. 2 where the video image data is supplied by stored television (TV) content.

FIG. 3 is a schematic diagram of a graphics controller of FIG. 2 where the video image data is supplied by stored television (TV) content. Stored TV content 132 can be any suitable TV content associated with digital television or high definition television. For example, stored TV content could be data stored on a hard drive such as those associated with digital video recorders. Similar to FIG. 3, CPU 112 directs stored TV content 132 to graphics controller 116. Graphics controller 116 processes the stored TV data as described with respect to FIG. 2. That is, the TV data is directly processed through flicker filter 124 and the filtered data is stored in RAM 122 so that single pipe buffer 126 can acquire at least one pixel of data in a single fetch. It should be appreciated that as only one memory access to RAM 122 is required to output a 32 bit pixel of data, the demands of single pipe buffer 124 on RAM 122 is reduced by about 50%, since previously two fetches were required to output a 32 bit pixel of data. Additionally, where each pixel is a 16 bit pixel, a 32 bit fetch represents two pixels.

Figure 4:
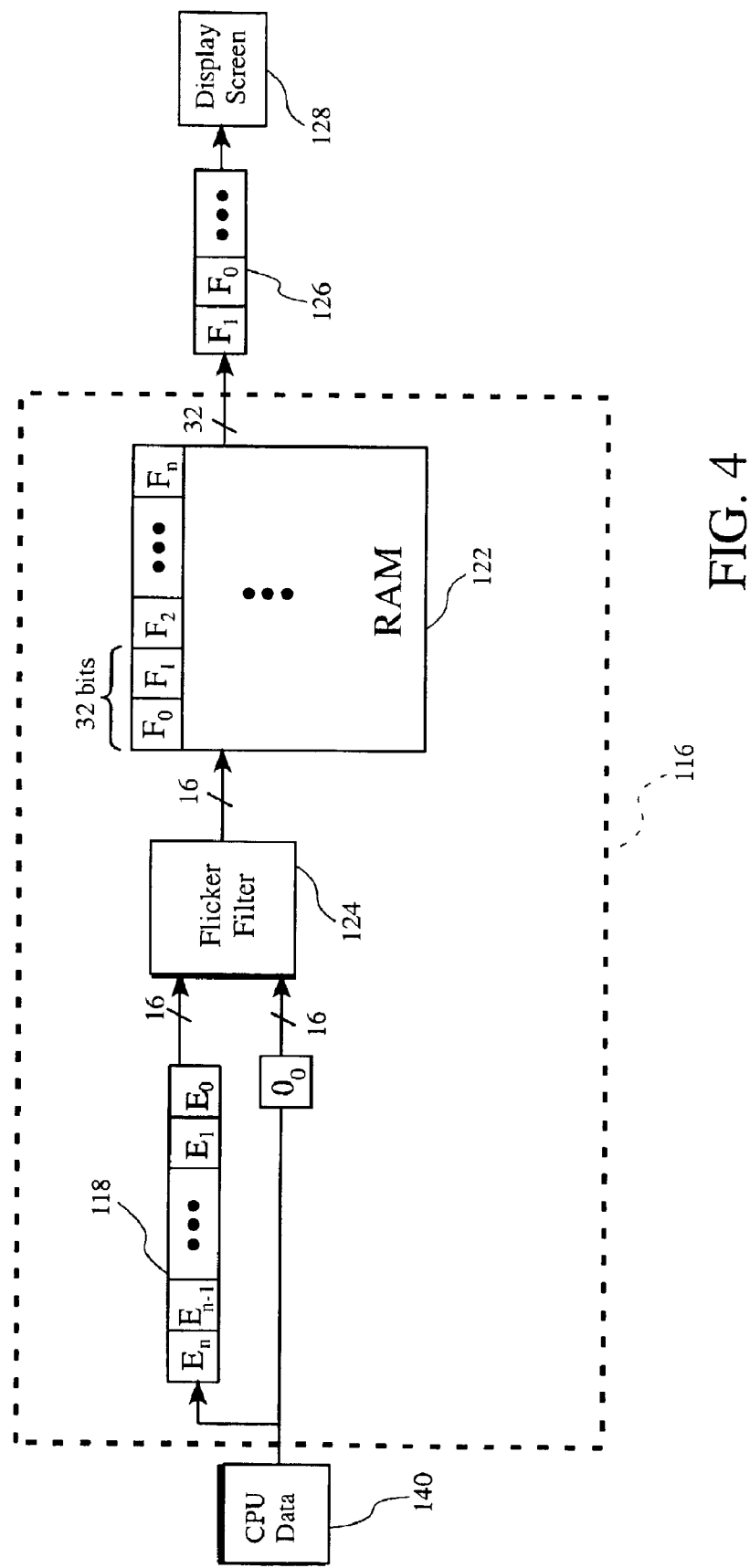
FIG. 4 is a schematic diagram of the process of supplying image data directly to a flicker filter to reduce memory requirements in accordance with one embodiment of the invention.

FIG. 4 is a schematic diagram of the process of supplying image data directly to a flicker filter to reduce memory requirements in accordance with one embodiment of the invention. CPU data 140 is received by graphics controller 116. CPU data 140 can be any interlaced image data to be processed by graphics controller 116, such as video source data and stored TV content of FIGS. 2 and 3, respectively. In one embodiment, CPU data 140 is processed through flicker filter enabling circuitry in communication with line buffer 118 in order to supply the even line data and odd line data of the interlaced image data to flicker filter 124, wherein each pair represents image data from adjacent lines. The flicker filter enabling circuitry will be described in more detail with respect to FIG. 5. Two 16 bit values, i.e., the even segment and the corresponding odd segment, are supplied to flicker filter 124. Flicker filter 124 is configured to reduce a flicker on a display of an interlaced scan by averaging data from adjacent lines to smooth a contrast between displayed lines.

Still referring to FIG. 4, the even and the odd segments are processed through flicker filter 124 to produce a 16 bit value. For example, even segment, $E_0$, and odd segment, $O_0$, are processed to produce filtered segment $F_0$, which is stored in random access memory RAM 122. More particularly, flicker filter 124 takes in two 16 bit operands (the even and odd segments) and outputs a 16 bit value (the filtered data). Flicker filter 124 processes the remainder of CPU data 140 in a similar fashion and the filtered data is stored in RAM 122. It should be appreciated that about a 50% savings in memory required is achieved in one embodiment as compared to a process where the even and the odd segments are stored in memory prior to being supplied to a flicker filter. Moreover, on the output side of RAM 122 only a single display pipe 126 is needed as separate even and odd data are supplied directly to flicker filter 124 and no longer stored in RAM 122. Therefore, memory requests are significantly reduced when supplying the image data directly to flicker filter 124 because the flicker filter does not need to request the data from RAM 122.

Display pipe 126 of FIG. 4 requests the flicker filtered data stored in RAM 122 for presentation on display screen 128. In one embodiment, two pixels at 16 bits per pixel (bpp), can be output for each 32 bit memory read, further reducing the memory requests from display pipe 126. One skilled in the art will appreciate that display pipe 126 can be any suitable size that allows for the presentation of the image data. Of course, display screen 128 can be any suitable display screen used to display an interlaced image such as a television screen.

Figure 5:
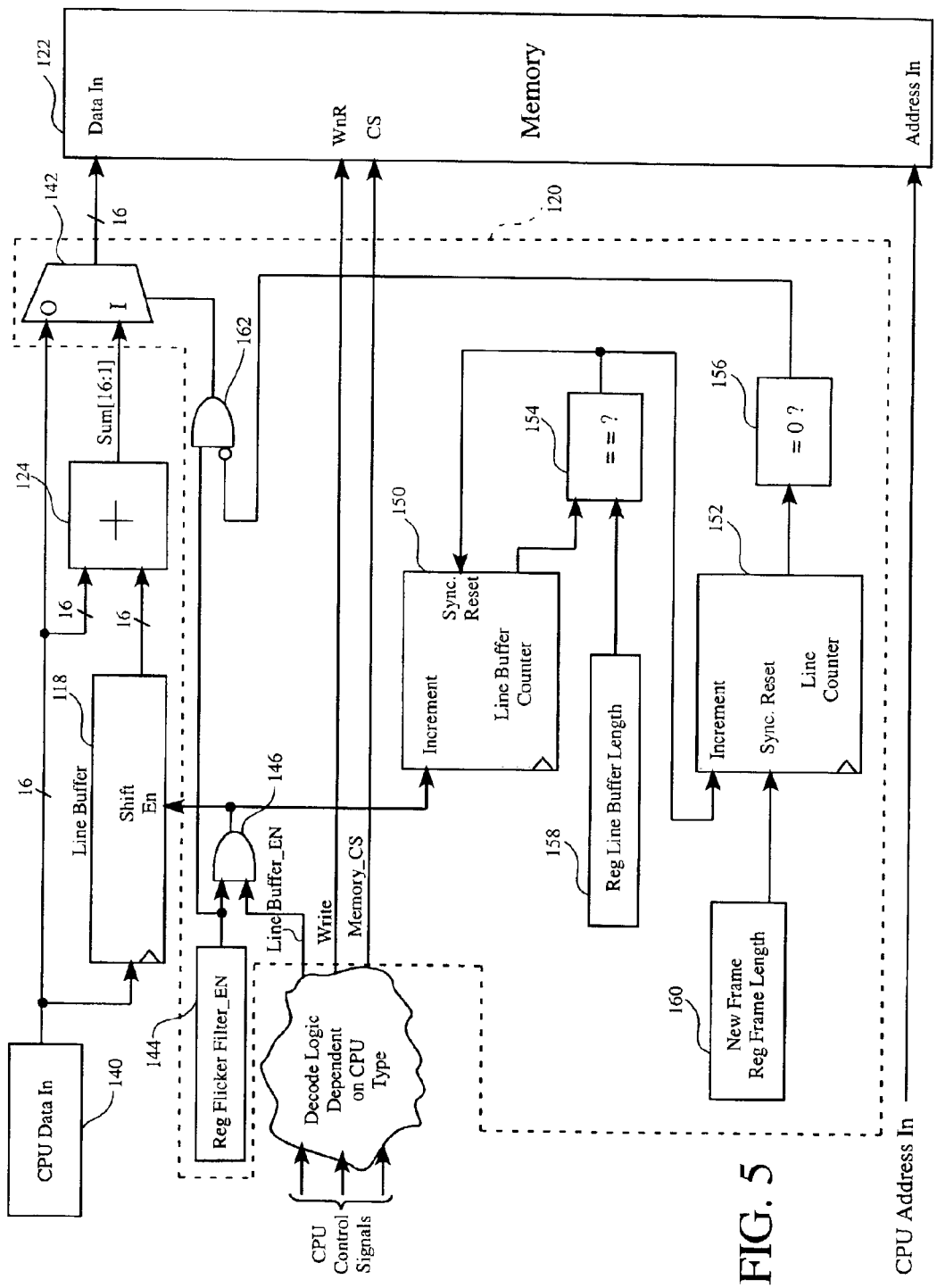
FIG. 5 is a schematic diagram of the components of the flicker filter enabling circuitry of a graphics controller configured to directly supply a flicker filter with even line data and odd line data segments in accordance with one embodiment of the invention.

FIG. 5 is a schematic diagram of the components of the flicker filter enabling circuitry of a graphics controller configured to directly supply a flicker filter with even line data and odd line data segments in accordance with one embodiment of the invention. CPU data 140 is received by line buffer 118. In one embodiment, flicker filter enabling circuitry 120 processes CPU data 140 so that the CPU data can be directly supplied to flicker filter 124 before the CPU data is written to memory. As CPU data 140 is received by the graphics controller, the data is placed into line buffer 118. In one embodiment line buffer 118 is a shift register. A shift enable signal communicated to the shift register directs the shift register to move the data over as more data is received. In one embodiment, the shift enable signal is sent to each latch or flip flop of line buffer 118. Thus, if the shift enable signal is active high, all the latches or flip flops are shifted if the shift enable signal is high during the clock cycle. However, if the shift enable signal is low, then nothing happens during the clock cycle. Output from AND gate 146 determines if the shift enable signal is a logical high or low value. More specifically, line buffer enable signal and RegFlickerFilter-En. signal to AND gate 146 drive the shift enable signal to a logical low or high value.

CPU control signals are received by the graphics controller of FIG. 5 and are translated by decode logic. Of course, the decode logic is dependent on a type of CPU. It will be apparent to one skilled in the art that the decode logic provides the address in memory, i.e., RAM 122, for data to be written to or read from the RAM. For example, a word line and bit line address in RAM 122 can be provided through the decode logic. In one embodiment, the control signals include a write signal, a byte enable signal, a chip select (CS) signal and a buffer enable signal. In another embodiment, the decode logic is located on the graphics controller at an interface of RAM 122.

Line buffer counter 150 of FIG. 5 counts the data coming into line buffer 118. That is, each time new data is shifted into line buffer 118, line buffer counter 150 is incremented based on the output of AND gate 146. As mentioned above, for interlaced scanning a frame of data is composed of a number of even and odd lines. The length of a line is stored in a register, such as RegLineBufferLength 158. Line buffer counter 150 outputs data to comparator 154. Comparator 154 compares the data from line buffer counter 150 to the length of the line from RegLineBufferLength 158 to determine if line buffer 118 has been filled with a line of data. Once line buffer 118 has been filled with a line of data, comparator 154 outputs a reset signal to line buffer counter 150, in order for the line buffer counter to begin counting the data for the next line as the data is received by the line buffer. It should be appreciated that this process is repeated for each line of the interlaced image data.

Still referring to FIG. 5, a signal from comparator 154 is sent to line counter 152 in addition to line buffer counter 150. Line counter 152 counts the number of lines for the frame and prevents writes to memory 122 when line buffer 118 is being filled with the first line of a frame. Comparator 156 compares the output from line counter 152 to determine if the line counter is zero, i.e., the first line is being received by line buffer 118. Thus, when line counter 152 is zero, the output from comparator 156 to AND gate 162 is configured such that CPU data 140 is selected by multiplexer 142 to write into RAM 122. It will be apparent to one skilled in the art that as flicker filter 124 averages adjacent even line and odd line data, i.e., two lines of data are required to perform the flicker filter function, therefore, the first line of data from a frame is written to RAM 122 and line buffer 118. AND gate 162 outputs a signal to multiplexer 142 to select between CPU data 140 and the output of flicker filter 124. Once line counter 152 is incremented, i.e., line buffer 118 has been filled with one line of data, the output of flicker filter 124 is selected to be written to RAM 122. That is, the output from comparator 156 is driven high once line counter 152 is incremented from 0, in turn the output from AND gate 162 is high as both inputs to AND gate 162 are high.

The inputs to AND gate 162 of FIG. 5 include the output of comparator 162 and the output of RegFlickerFilter-En., which is a flicker filter enable signal. Of course, the write scheme of the data from the CPU and the data from line buffer 118, such as alternating even and odd segments, is dependent on the method for flicker filtering the data. Exemplary methods for flicker filtering the data are discussed with reference to FIGS. 6A–6C. It will be apparent to one skilled in the art that while the signals described above are active high, the circuitry can also be designed such that the signals are active low.

Figure 6A:
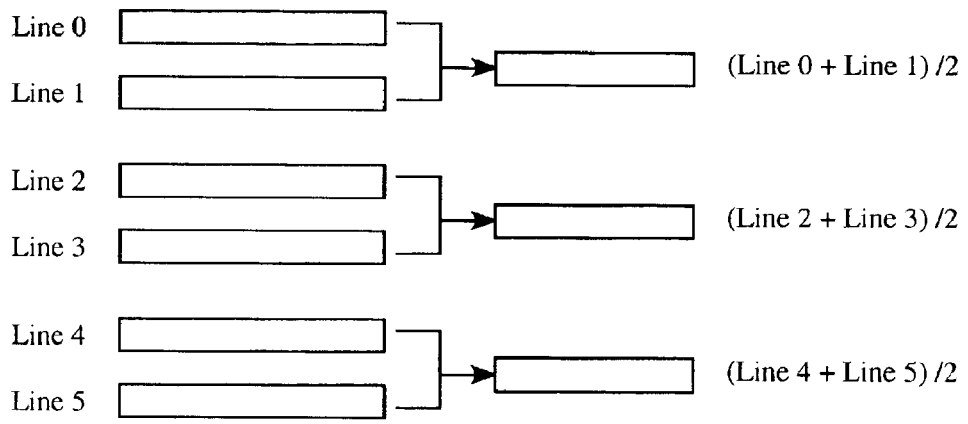
FIG. 6A is a schematic diagram of a flicker filtering technique for image data to be presented through an interlaced scan in accordance with one embodiment of the invention.
Figure 6A:
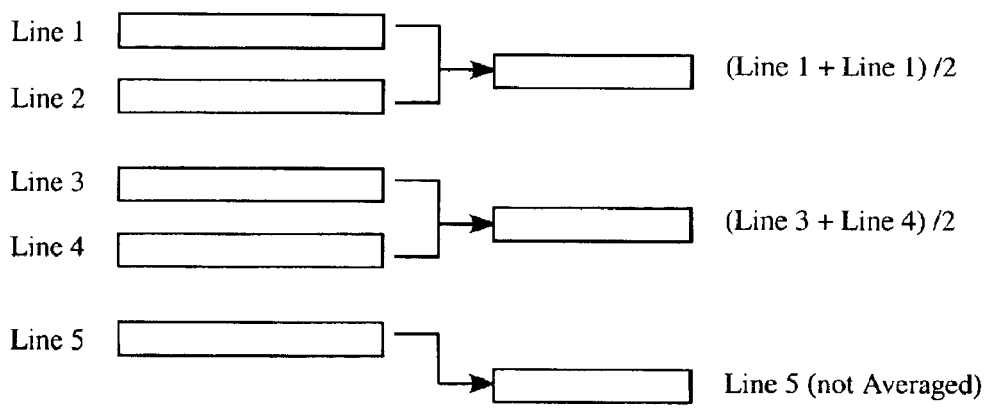

FIG. 6A is a schematic diagram of a flicker filtering technique for image data to be presented through an interlaced scan in accordance with one embodiment of the invention. One skilled in the art will appreciate that flicker filtering reduces a flicker caused by contrast between adjacent lines of an interlaced scan. Even field lines (field 0) begin with line 0 and average each pair of lines. For example, line 0 and line 1 are averaged to produce a first line of the even field, then lines 2 and 3 are averaged to produce a second line of the even field, and so on. Odd field lines (field 1) begin with line 1 and average each pair of lines. For example, line 1 and line 2 are averaged to produce a first line of the even field, then lines 3 and 4 are averaged to produce a second line of the even field, and so on. Accordingly, the first display line in field 0 contains information from original line 0, but the first display line in field 1 does not contain any information from original line 0. In one embodiment of the invention the data and arrangement circuitry of FIG. 5 is configured to accommodate the flicker filtering technique described above.

Figure 6B:
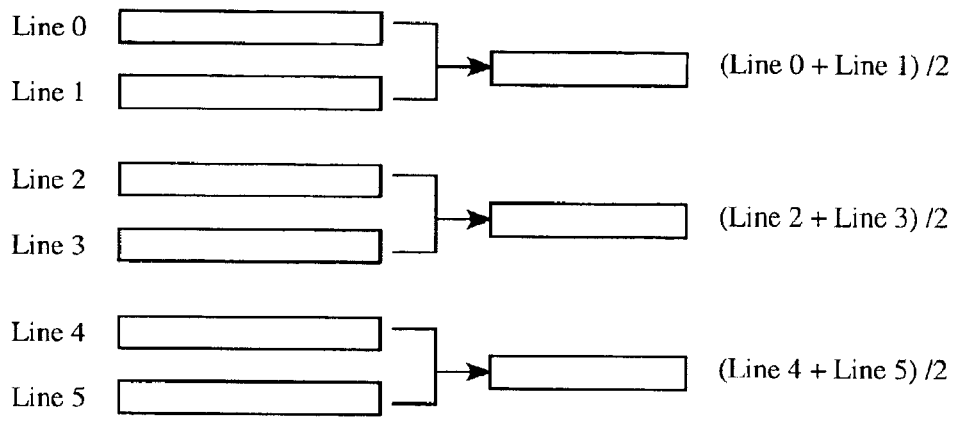
FIG. 6B is a schematic diagram of an alternative flicker filtering technique for image data displayed through interlaced scanning in accordance with one embodiment of the invention.
Figure 6B:
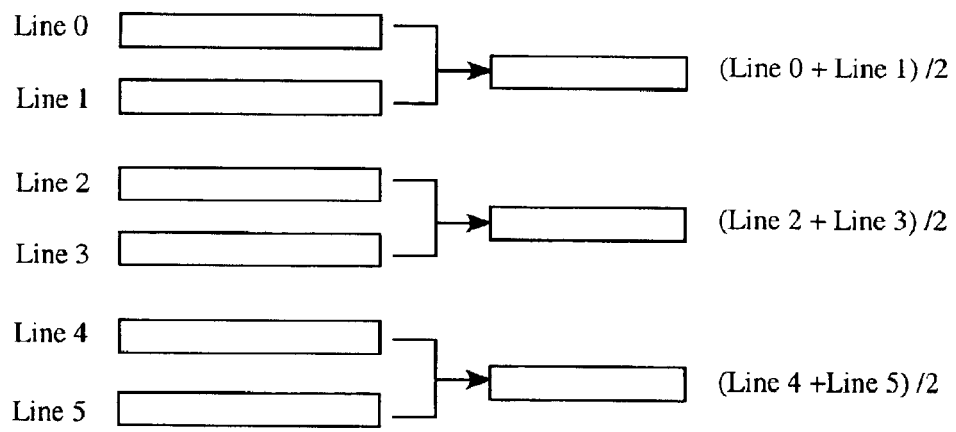

FIG. 6B is a schematic diagram of an alternative flicker filtering technique for image data displayed through interlaced scanning in accordance with one embodiment of the invention. Here, the flicker filtering technique generates lines from the even field and the odd field that contain the same amount of information. In particular, both the even field and the odd field begin with line zero of the frame and average each pair of lines. For example, line zero and line 1 are averaged to define a first line of the even and the odd fields. Likewise, line 2 and line 3 are averaged to define the second line of the even and the odd fields, and so on. Thus, the first display lines in both the even field and the odd field will now contain the same amount of information. By having the filtered even lines identical to the filtered odd lines, flicker-filtered images to be displayed in an interlaced fashion are generated for a display screen.

Figure 6C:
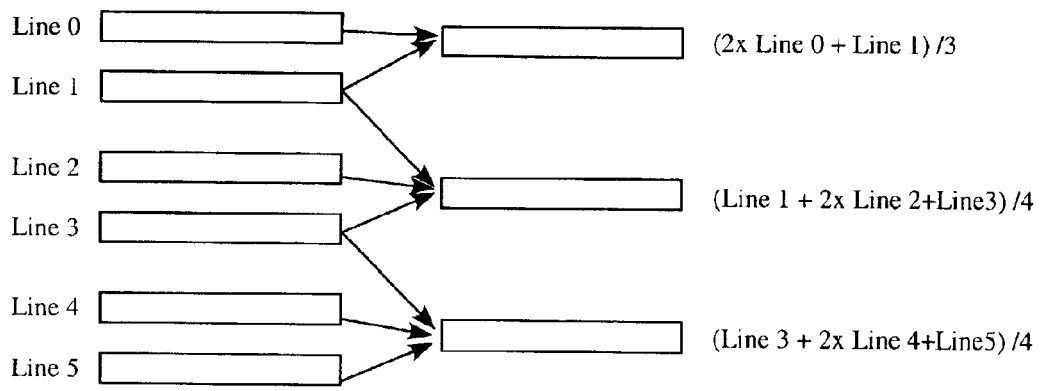
FIG. 6C is a schematic diagram of another alternative mode of flicker filtering even and odd field lines for a computer generated image to be presented in an interlaced fashion in accordance with one embodiment of the invention.
Figure 6C:
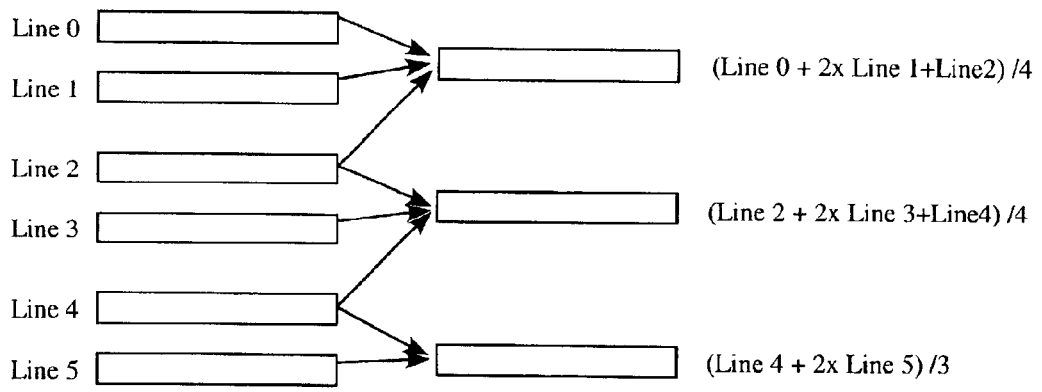

FIG. 6C is a schematic diagram of another alternative mode of flicker filtering even and odd field lines for a computer generated image to be presented in an interlaced fashion in accordance with one embodiment of the invention. Here, a weighted average of multiple lines is used to generate even and odd lines. For example, the first even field line is a weighted average of line zero and line 1. That is, the data of line zero is doubled and added to the data of line 1, whose sum is divided by 3 to obtain a first even field line. As can be seen, the second even field line is calculated by taking a weighted average between lines 1, 2, and 3 where line 2 is counted twice. The odd field lines are similarly calculated, however, for the first odd field line, a weighted average is taken of the first three lines, and so on. The resulting interlaced image presented of the combined filtered even field lines and odd field lines results in a smoother presentation where sharp transitions and contrasts are softened through the weighted average between multiple lines.

It should be appreciated that the invention is not limited to the flicker filtering algorithms described with reference to FIGS. 6A–6C as there are many suitable flicker filter algorithms. In general, flicker filters average the color components of each segment in two or more adjacent display lines to minimize a flicker associated with sudden sharp intensity differences between corresponding even and odd segments of the adjacent lines when the display lines are presented through interlaced scanning techniques.

Figure 7:
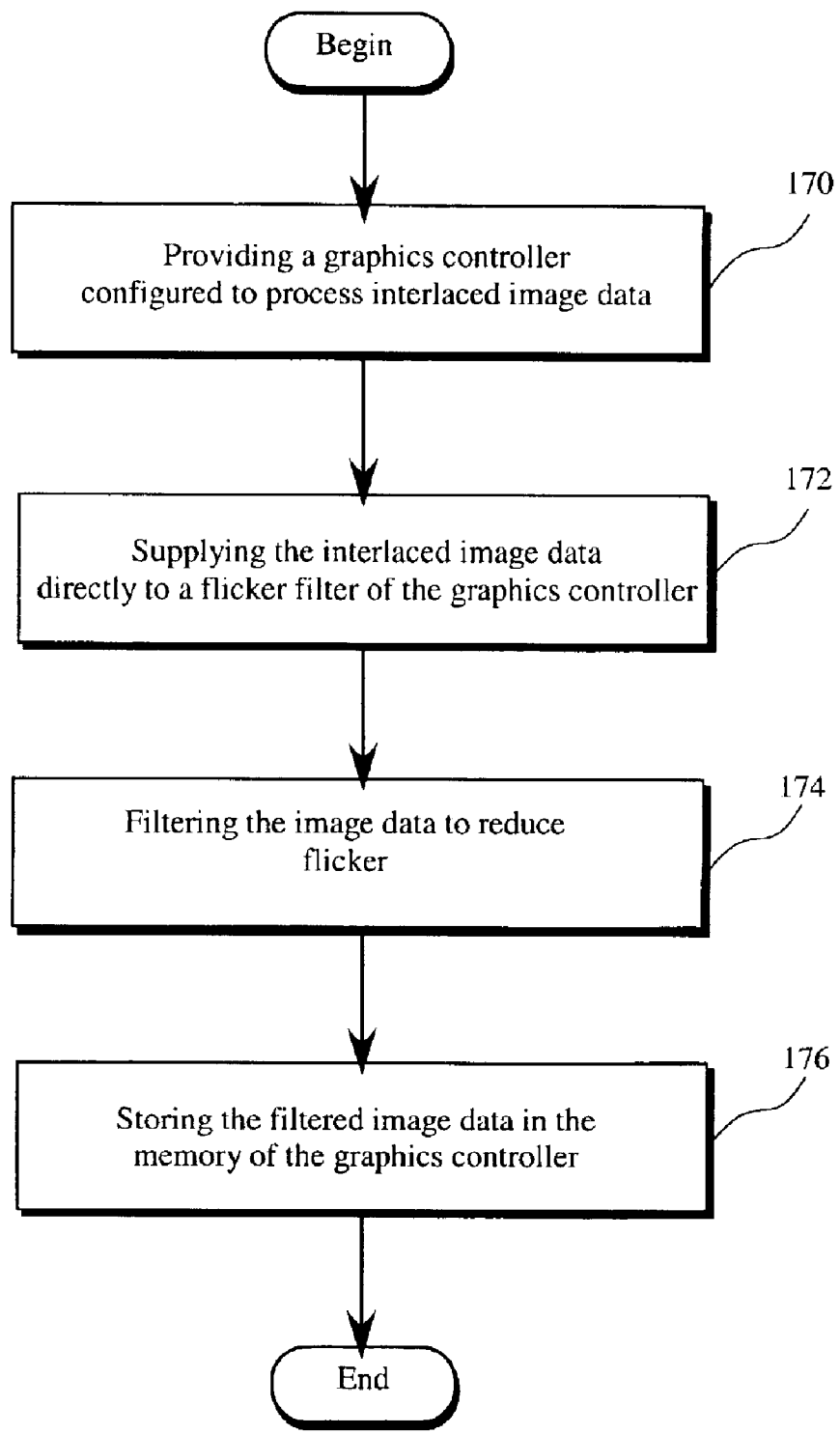
FIG. 7 is a flowchart diagram of the method operations for storing image data to be presented through interlaced scanning in accordance with one embodiment of the invention.

FIG. 7 is a flowchart diagram of the method operations for storing image data to be presented through interlaced scanning in accordance with one embodiment of the invention. The method initiates with operation 170 where a graphics controller configured to process interlaced image data is provided. A suitable graphics controller is the graphics controller of FIGS. 2 and 3. In one embodiment, the graphics controller includes flicker filter enabling circuitry, as described with reference to FIG. 5. The flicker filter enabling circuitry supplies the flicker filter with adjacent even and odd segments of the image data according to one flicker filtering technique. The method then advances to operation 172 where the interlaced image data is supplied to a flicker filter of the graphics controller. It should be appreciated that the interlaced image data is supplied directly to the flicker filter. That is, the interlaced image data is not copied to the onboard memory of the graphics controller. Thus, the flicker filter function is performed on the data before any image data is written to memory.

Still referring to FIG. 7, the method proceeds to operation 174 where the interlaced image data is filtered to reduce flicker. Suitable flicker filtering techniques include the flicker filtering techniques discussed above with reference to FIGS. 6A–6C. It will be apparent to one skilled in the art that any suitable flicker filtering technique may be executed by the flicker filter. The method then moves to operation 176 where the filtered image data is stored in the graphics controller memory. In one embodiment, the inputs to the flicker filter are a 16 bit even segment and a 16 bit odd segment. The flicker filter processes the inputs and outputs a 16 bit value representing a pixel of data. Thus, a 16 bit value is written to memory, rather than 32 bits consisting of a 16 bit even segment and a 16 bit odd segment. Consequently, a 50% savings in memory is realized here. In addition, a display pipe on the output side of the memory can obtain the pixel data with half as many memory requests. That is, two pixels at 16 bpp can be output for each 32 bit memory read.

In summary, the above described invention allows for a reduced memory capacity and reduced demands on the memory by flicker filtering incoming image data as the image data is received. Thus, the flicker filter function is performed on the image data before the data is written to memory. It should be appreciated that the memory can be an onboard memory of the graphics controller or an external memory in communication with the graphics controller. Furthermore, the image data is fed directly to the graphics controller, where flicker filter enabling circuitry, in conjunction with a single line buffer, supplies the data to the flicker filter according to the flicker filter algorithm being executed by the flicker filter.

The above described invention may be practiced with any display system using interlaced scanning to present an image on a display screen. With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer readable medium is any data storage device that can store data which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent from the foregoing description that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A graphics controller, comprising:
   a buffer;
   a memory region;
   a flicker filter for reducing a flicker of a display presented through an interlaced scan, the flicker filter configured to receive interlaced image data prior to any received image data being stored in the memory region, the flicker filter outputting filtered data defining a pixel, the filtered data being stored in the memory region such that two pixels can be output in one memory access to the memory region; and
   flicker filter enabling circuitry in communication with the buffer, the flicker filter enabling circuitry configured to supply an even segment and a corresponding odd segment of the interlaced image data to the flicker filter.

2. The graphics controller of claim 1, wherein the flicker filter enabling circuitry is configured to write a first line of a frame of the interlaced image data to the memory region.

3. The graphics controller of claim 1, wherein the flicker filter enabling circuitry further includes:
   a multiplexer configured to select one of the filtered data and a first line of a frame of the interlaced image data for writing to memory;
   a line buffer counter in communication with a first comparator; and
   a line counter in communication with a second comparator.

4. The graphics controller of claim 3, wherein the line buffer counter is configured to determine when the buffer contains an entire line of interlaced image data.

5. The graphics controller of claim 3, wherein the first comparator is configured to output a signal configured to both reset the line buffer counter and increment the line counter, upon receipt of the entire line by the buffer.

6. The graphics controller of claim 3, wherein the second comparator is configured to output a signal to the multiplexer indicating whether to select one of the filtered data and a first line of a frame of the interlaced image data for writing to memory.

7. The graphics controller of claim 1, wherein the buffer is a shift register configured to hold a single line of interlaced image data.

8. The graphics controller of claim 1, wherein the flicker filter is configured to average two 16 bit inputs and provide a 16 bit output, wherein the 16 bit output represents one pixel.

9. An apparatus for displaying an interlaced image on a display screen, the apparatus comprising:
   a central processing unit (CPU);
   a graphics controller configured to receive interlaced image data, the graphics controller including a flicker filter configured to combine even line data and odd line data to reduce flicker, the even line data and the odd line data provided directly to the flicker filter without storing the even line data and the odd line data in a memory associated with the graphics controller, the flicker filter configured to output the combined even and odd line data to the memory associated with the graphics controller;
   a bus in communication with the CPU and the graphics controller; and
   a display screen for presenting the combined even and odd line data in the memory of the graphics controller.

10. The apparatus of claim 9 wherein the display screen is a television display screen.

11. The apparatus of claim 9 wherein the graphics controller further includes:
    a shift register configured to hold a line of interlaced image data; and
    flicker filter enabling circuitry in communication with the shift register, the flicker filter enabling circuitry configured to supply the even line data and the odd line data of the interlaced image data to the flicker filter.

12. The apparatus of claim 11, wherein the flicker filter enabling circuitry further includes:
    a multiplexer configured to select one of the combined even and odd line data and a first line of a frame of the interlaced image data, for writing to memory;

a line buffer counter in communication with a first comparator; and a line counter in communication with a second comparator.

13. The apparatus of claim 12, wherein the second comparator is configured to output a signal to the multiplexer indicating whether to select one of the combined even and odd line data and a first line of a frame of the interlaced image data for writing to memory.

14. The apparatus of claim 12, wherein the first comparator is configured to output a signal configured to both reset the line buffer counter and increment the line counter, upon receipt of an entire line by the shift register.

15. The apparatus of claim 12, wherein the line buffer counter in communication with the first comparator determines if an end of a line has been received by the shift register.

16. A method for storing image data to be presented through interlaced scanning, the method comprising:

using a graphics controller configured to process interlaced image data;

supplying the interlaced image data to a flicker filter of the graphics controller without copying the interlaced image data to a memory associated with the graphics controller;

filtering the interlaced image data to reduce a flicker; and storing the filtered image data in the memory associated with the graphics controller.

17. The method of claim 16, wherein the method operation of supplying the interlaced image data to a flicker filter of the graphics controller without copying the interlaced image data to memory of the graphics controller further includes:

arranging the interlaced image data so that an even segment and a corresponding adjacent odd segment are contemporaneously supplied to the flicker filter.

18. The method of claim 16 further including:

using a shift register configured to hold a complete line of the interlaced image data; and enabling the storage of the filtered image data after the receipt of a first complete line of a frame of the interlaced image data into the shift register.

19. The method of claim 17 further including:

counting each even segment and each odd segment;

determining when a complete one of an even line and an odd line of the interlaced image data has been received; and outputting a signal configured to reset a first counter counting each even segment and each odd segment in response to the complete one of an even line or an odd line of the interlaced image data being received.

20. The method of claim 19, wherein the signal is configured to increment a second counter, the second counter configured to count a number of lines of a frame received by the graphics controller.

21. A method for processing image data having an interlaced format, the method comprising:

using a graphics controller configured to process interlaced image data;

receiving a first line of the interlaced image data by a line buffer of the graphics controller;

receiving a second line of the interlaced image data;

supplying segments of the first line of the interlaced image data and corresponding segments of the second line of the interlaced image data to a flicker filter of the graphics controller;

writing the segments of the first line to a memory associated with the graphics controller;

filtering the segments of the first line and the corresponding segments of the second line to reduce a flicker prior to writing any further image data to a memory of the graphics controller; and storing the filtered data in memory such that the stored filtered data is configured to output at least two pixels of data in a single memory read.

22. The method of claim 21, wherein the method operation of writing the segments of the first line to a memory associated with the graphics controller further includes:

receiving a signal configured to select the first line.

23. The method of claim 21, wherein the method operation of supplying segments of the first line of the interlaced image data and corresponding segments of the second line of the interlaced image data to a flicker filter of the graphics controller further includes:

arranging the interlaced image data so that a segment of the first line and a corresponding adjacent segment of the second line are contemporaneously supplied to the flicker filter.

24. The method of claim 21 further including:

counting each of the segments of the first line and each of the segments of the second line;

determining when the first line of the interlaced image data has been completely received; and outputting a signal configured to reset a first counter counting each segment of first line in response to the first line being completely received.

25. The method of claim 24, wherein the signal is configured to increment a second counter, the second counter configured to count a number of lines of a frame received by the graphics controller.

* * * * *